(12) United States Patent
Marcum

(10) Patent No.: US 11,180,067 B2
(45) Date of Patent: Nov. 23, 2021

(54) RAPID LOADING SLED FOR WHEELED VEHICLE TRANSPORTATION

(71) Applicant: Frank D. Marcum, Lexington, KY (US)

(72) Inventor: Frank D. Marcum, Lexington, KY (US)

( * ) Notice: Subject to any disclaimer, the term of this patent is extended or adjusted under 35 U.S.C. 154(b) by 187 days.

(21) Appl. No.: 15/936,646

(22) Filed: Mar. 27, 2018

(65) Prior Publication Data

US 2018/0272913 A1   Sep. 27, 2018

Related U.S. Application Data

(60) Provisional application No. 62/477,194, filed on Mar. 27, 2017.

(51) Int. Cl.
| | |
|---|---|
| *B60P 1/43* | (2006.01) |
| *B60P 3/06* | (2006.01) |
| *B60P 1/64* | (2006.01) |

(52) U.S. Cl.
CPC ............. *B60P 1/433* (2013.01); *B60P 1/6454* (2013.01); *B60P 3/06* (2013.01)

(58) Field of Classification Search
CPC ......... B60P 1/433; B60P 1/6454; B60P 1/431; B60P 1/64; B60P 3/06; B60P 3/07; B60P 3/122; B60P 3/1066
USPC .......... 414/538, 500, 498, 559, 506
See application file for complete search history.

(56) References Cited

U.S. PATENT DOCUMENTS

| | | | | |
|---|---|---|---|---|
| 3,471,048 A * | 10/1969 | Terho | .................... | B60P 1/6454 410/73 |
| 3,606,249 A * | 9/1971 | Pewthers | .................. | B60P 1/30 254/423 |
| 5,556,249 A * | 9/1996 | Heine | ................... | B60P 1/6454 414/477 |
| 6,065,917 A * | 5/2000 | Shambeau | ............ | B60P 7/0807 410/106 |
| 6,099,232 A * | 8/2000 | Dixon | ....................... | B60P 1/14 224/310 |
| 6,276,890 B1 * | 8/2001 | Pratt | ....................... | B60P 3/122 414/477 |
| 6,413,033 B1 * | 7/2002 | Monroig, Jr. | ........... | B60P 3/122 414/462 |
| 6,524,056 B1 * | 2/2003 | Kloster | ................... | B60P 3/075 224/571 |
| 8,371,798 B2 * | 2/2013 | Jaeger | ..................... | B60P 3/122 414/812 |
| 2003/0082034 A1 * | 5/2003 | Barrett | ..................... | B60P 3/07 414/462 |
| 2010/0272549 A1 * | 10/2010 | Petty | ...................... | B60P 3/122 414/500 |
| 2016/0185272 A1 * | 6/2016 | Clark | ................... | B60P 1/4407 414/477 |

(Continued)

*Primary Examiner* — Glenn F Myers
(74) *Attorney, Agent, or Firm* — Eversheds Sutherland (US) LLP

(57) ABSTRACT

A rapid loading sled for use during the transportation of wheeled vehicles via trailer or truck. The sled includes a body with a frame and deck that provide a low profile surface for loading and securing a wheeled vehicle to before the sled is loaded on a trailer or truck for transportation. The sled includes a sliding assembly to improve maneuverability during loading and a winch system for guiding the retractable cable of a winch during operation.

24 Claims, 6 Drawing Sheets

(56) References Cited

U.S. PATENT DOCUMENTS

2016/0221487 A1\* 8/2016 Luchsinger ............. B60P 1/431
2018/0361903 A1\* 12/2018 Dees ..................... B62B 5/0093

\* cited by examiner

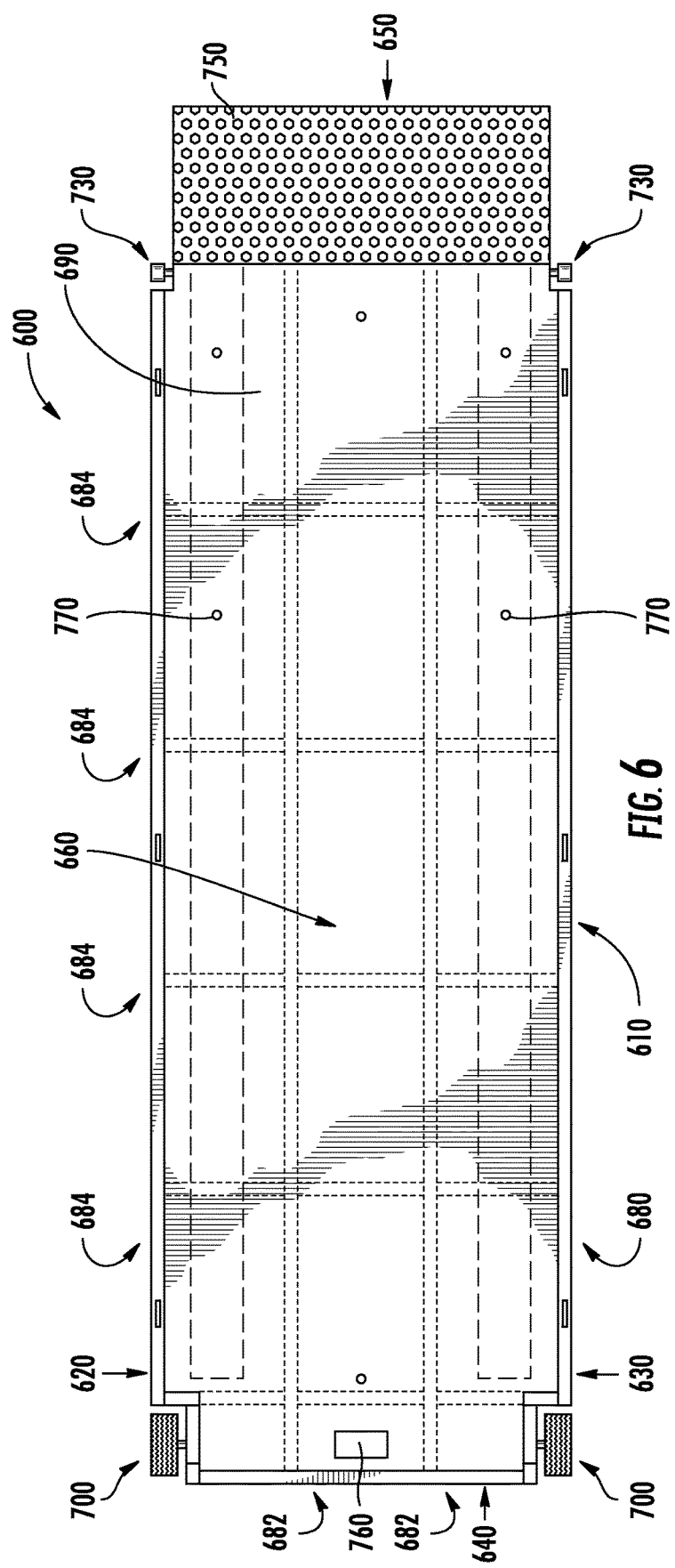
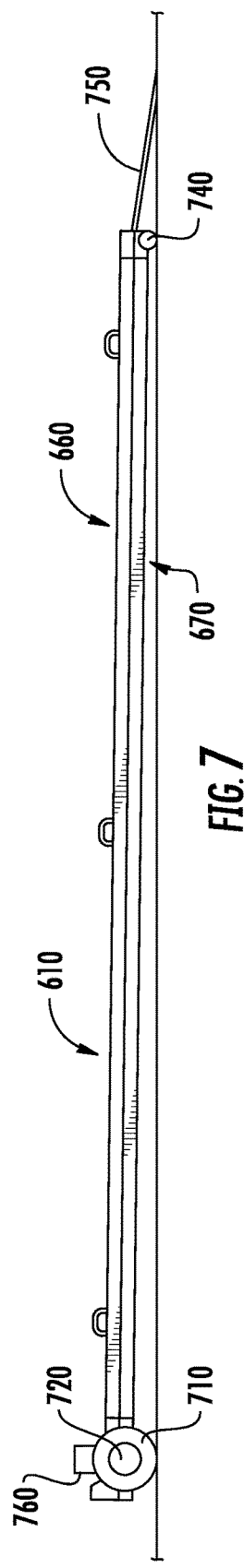
FIG. 6
FIG. 7

RAPID LOADING SLED FOR WHEELED VEHICLE TRANSPORTATION

CROSS REFERENCE TO RELATED APPLICATIONS

This application claims priority benefit of U.S. Provisional Application No. 62/477,194, titled "Rapid Loading Sled for Wheeled Vehicle Transportation" and filed on Mar. 27, 2017, which is incorporated herein by reference.

FIELD OF THE DISCLOSURE

The present disclosure relates generally to the transportation industry, and more particularly, to wheeled vehicle transportation trailers and vehicles.

BACKGROUND

Various types of wheeled vehicle-carrying systems are known in the art, including fixed trailer, roll-back trucks, haulers, and trailers, squatting trailers, as well as vehicles adapted for carrying wheeled vehicles, including tow-trucks and flat-bed trucks. Wheeled vehicle-carrying systems may be used to transport many types of wheeled vehicles including automobiles, trucks, motorcycles, scooters, ATVs, other trailers, and the like. Similarly, various types of devices to aide in the loading of trucks and trailers are also known in the art, including sleds, ramps, articulating beds, and hydraulic lifts. Typically, the loading of wheeled vehicles and the like onto the bed of a truck or trailer requires elevating the vehicle from the ground level to the level of the truck bed or trailer. In its most simple form, this is accomplished through the use of ramps. Either under the vehicle's own power, or from an external source like a winch, the vehicle is rolled up the ramps to the level of the truck bed or trailer where it is secured for transportation. Ramps are available in a variety of configurations, but generally include either a single wide ramp, or more commonly a ramp for each vehicle track. As a practical matter, the angle of approach of the ramp is a byproduct of the length of the ramp and the height of the truck bed or trailer.

In response, various types of truck beds and trailers have been developed to help lower the loading point for the vehicle to make the loading process not only easier for the operators and less dangerous, but also to decrease the angle of approach. Some trailers utilize hydraulic or air suspension systems to drop the actual height and raise the trailer and its cargo back up to travel height. These types of trailers are complex, heavy, and expensive. They include high pressure hydraulic and air systems that require additional maintenance and expense. To provide a simpler solution, trailers have been developed with articulating beds, allowing the trailer bed to selectively pivot, generally around the axel of the trailer. While these types of trailers are much simpler, they often still have very high angles of approach, with the optimal trailers offering at best, an 11 degree angle of approach. Roll-back trailers were developed as another way of lowering the angle of approach, without the need for long ramps or complex height-adjusting systems. Once a roll back trailer is in place, the bed is unlocked and the trailer brakes are set. The tow vehicle then moves forward which pulls a portion of the trailer, including the axels, forward. As a result, when the bed pivots, the pivot point (axels) are much further forward than they are with a traditional trailer, allowing for a lower angle of approach. Still, the best roll-back trailers are only capable of 5 degree angles of approach.

There are several circumstances where a low angle of approach during loading is not only desirable, but often times mandatory. Variations in a vehicle's configuration change the amount of clearance that is available for loading. Vehicles with low ground clearance, or large front overhangs in front of the tires, require lower angles of approach in order to be loaded onto a truck or trailer without damaging the vehicle. Many cars, including exotic sports cars and race cars, have low lying bodywork and front spoilers that further reduce the available clearance. A race car's aerodynamic bodywork is often designed to nearly eliminate ground clearance and may overhang the vehicles axels much further than normally found in a road car. The ability to achieve "touch-free" loading of vehicles with limited clearance is plainly desirable to avoid damage.

Many auto enthusiasts drive their street cars and race cars on the race track. During these events it is not uncommon for mechanical failure, driver error, or collisions to result in cars being disabled on the track. When this occurs, it is imperative for track officials to be able to remove the automobiles quickly, safely, and without damage. Any time spent loading and transporting the cars directly takes away from the time available for the race, or for the other participants' use of the track. In most instances, only a finite amount of "hot" track time is available, and any stoppages or cautions cannot be made up by extending the sessions or races.

In most instances, the vehicle to be transported has become disabled and unable to move under its own power. In these instances, the vehicle must be dragged or pulled onto the truck or trailer. In certain circumstances, the vehicle may have sustained damage to suspension components, bodywork, or wheels that further reduce or even eliminate ground clearance. The cars driven at these events are often rare or vintage automobiles that can be exceptionally valuable, increasing the importance to eliminate the potential for causing any additional damage when loading the automobiles on the truck or trailer.

Most commonly, race-tracks utilize roll-back haulers and trailers for their low cost, simplicity, and low angle of approach. Due to the limitations discussed above, officials often have to use long wooden boards to help further reduce the approach angle to retrieve the low and damaged cars.

Accordingly, there is a desire for an improved wheeled vehicle loading system that accommodates low and damaged vehicles, is quick to load, and minimizes potential damage to the transported vehicle.

BRIEF DESCRIPTION OF THE DRAWINGS

The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

FIG. 6 is a top view of a rapid loading sled in accordance with one or more embodiments of the disclosure.

FIG. 7 is a side view of a rapid loading sled in accordance with one or more embodiments of the disclosure.

DETAILED DESCRIPTION

Exemplary embodiments will now be described more fully hereinafter with reference to the accompanying drawings, in which exemplary embodiments are shown. The concepts disclosed herein may, however, be embodied in many different forms and should not be construed as limited to the exemplary embodiments set forth herein; rather, these embodiments are provided so that this disclosure will be thorough and complete, and will fully convey the scope of the concepts to those skilled in the art. Like numbers refer to like, but not necessarily the same or identical, elements throughout.

The present disclosure includes non-limiting embodiments of rapid loading sleds within the scope of the disclosure. The embodiments are described in detail herein to enable one of ordinary skill in the art to practice the disclosure and related methods of use, although it is to be understood that other embodiments may be utilized and that logical changes may be made without departing from the scope of the disclosure.

FIGS. 1 through 7 depict a sled 100 for rapidly loading and transporting a wheeled vehicle on a trailer or truck bed (which may be referred to simply as a "sled" herein) according to one or more elements of the disclosure. The sled 100 is configured to be carried on and deployed from a wheeled vehicle-carrier, such as a trailer or truck bed, to allow for the rapid loading and securement of an operational or disabled vehicle on the sled 100, and the re-loading and securement of the sled 100 and vehicle on the wheeled vehicle-carrier.

Figure 1:
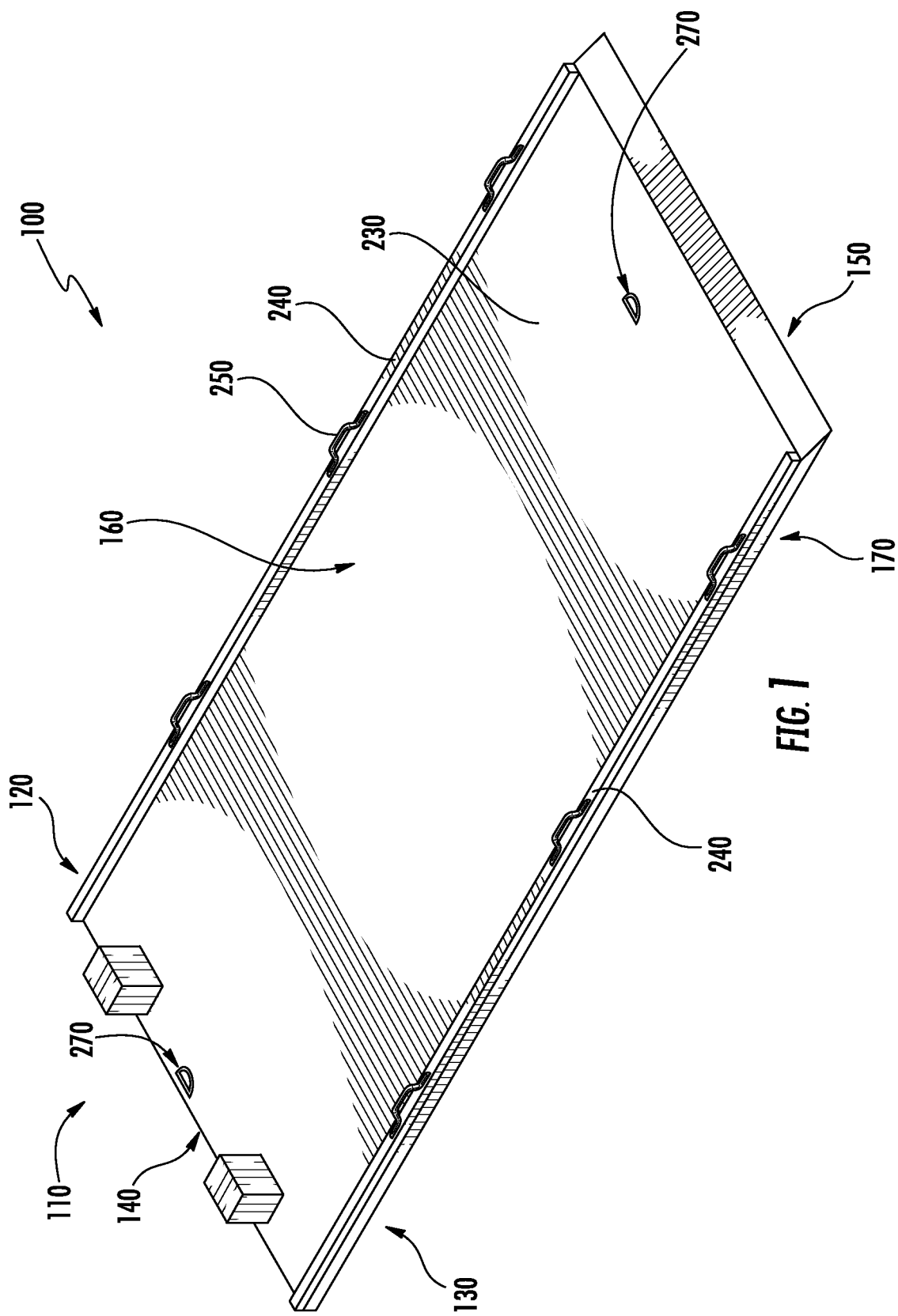
FIG. 1 is a perspective view of a rapid loading sled in accordance with one or more embodiments of the disclosure.
Figure 2:
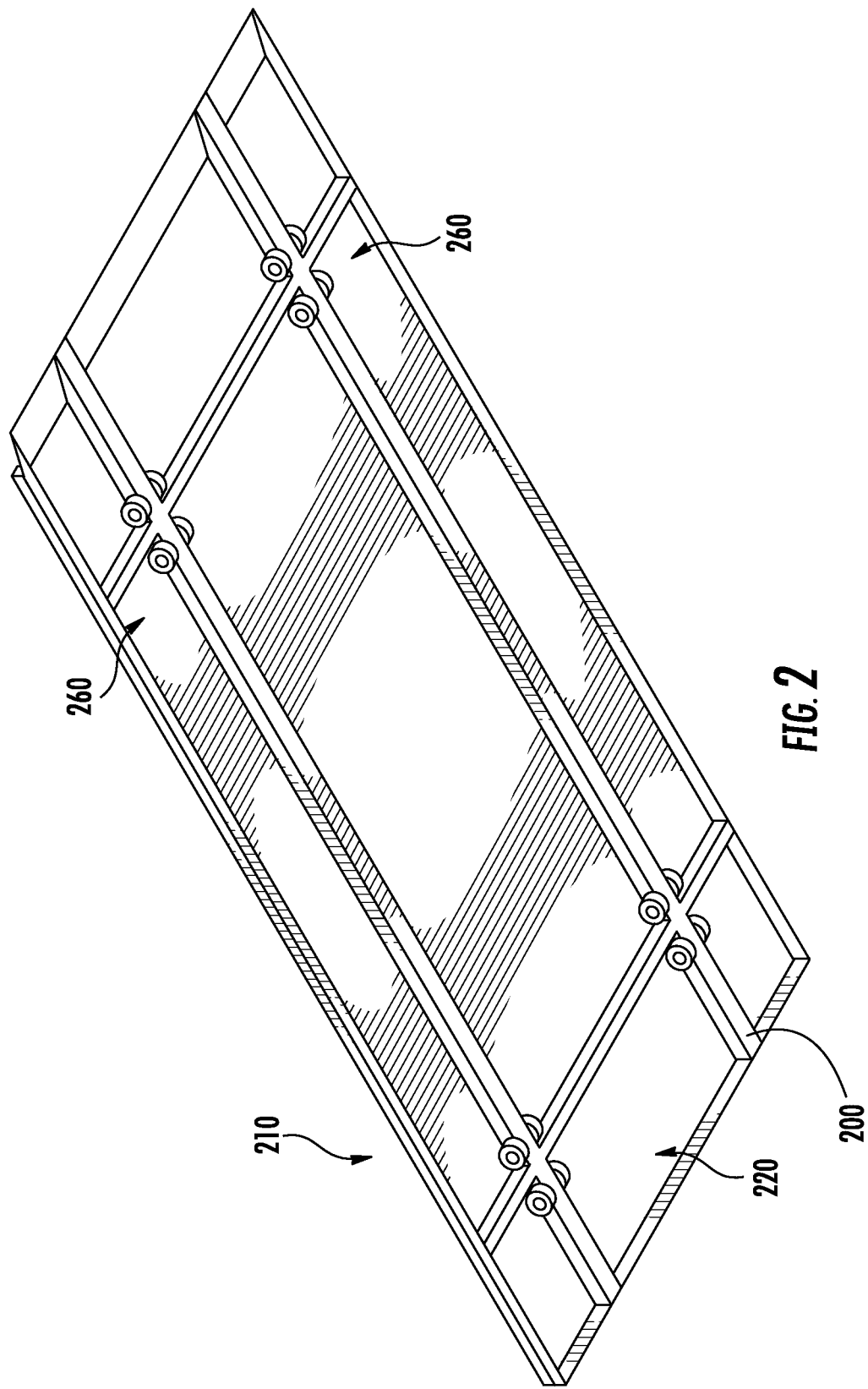
FIG. 2 is a bottom perspective view of a rapid loading sled in accordance with one or more embodiments of the disclosure.

As shown in FIGS. 1 and 2, the sled 100 may have a low-profile sled body 110, the body being generally rectangular and having two sides 120 and 130, a front 140, a rear 150, a top plane 160, and a bottom plane 170. The sled body 110 may include a frame assembly 200, with a top plane 210 and a bottom plane 220, and a deck 230 supported above the frame assembly with a top and a bottom. In one example embodiment, the deck 230 is solid to prevent the spillage of any fluids that may leak from the vehicle during transport. In other example embodiments the deck 230 may be porous to reduce weight, or may include catch basins, to increase its capacity for retaining fluids. In yet other exemplary embodiments, the sled may be used with sorbent pads, rolls, socks, or other absorbing materials to retain any leaking fluids, and, in some instances, the deck 230 may be specially configured to hold and retain such spill controlling devices. In some exemplary embodiments, the deck 230 may include side rails 240 that may be used to mount grab handles 250 or tie downs or to help contain fluids and materials from moving off the deck 230 during transportation. In some embodiments, the rails 240 may create a liquid tight perimeter around the deck 230, resulting in the deck's ability to retain a certain volume of spilled liquids. In one example embodiment the deck 230 is made of aluminum to help reduce weight. The frame assembly 200 and deck 230 are configured to provide a smooth transition from the ground, which may be in contact with the bottom plane 220 of the sled body 110, to the deck 230, at the rear of the sled body. The sled body 110 may be shaped and sized to movably slide onto a wheeled vehicle-carrying apparatus, for example, when the sled body is pulled onto the wheeled vehicle-carrying apparatus by a winch mounted on the wheeled vehicle-carrying apparatus. The sled 100 may also include a slide assembly 260 mounted to the sled body 110 and a winch cable guide assembly 270 configured for use when connecting the sled 100 to a winch mounted on the wheeled vehicle-carrying apparatus.

In one exemplary embodiment, the winch cable guide assembly 270 may include a series of guides that may be configured to receive and control the movement of a retractable cable of a winch. In one exemplary embodiment, the guides may be D-rings, rotatably mounted to the top surface of the deck. In other embodiments, the guides may be tubes mounted on the deck, or channels in the deck, or may include protrusions that extend upward from the deck creating a pathway for the cable.

As shown in FIG. 2, certain exemplary embodiment may include a slide assembly 260 that includes rollers that may be rotatably mounted to the sled body 110. The slide assembly 260 is configured to reduce the effort required to move the sled on and off of the wheeled vehicle-carrying apparatus, and to move and position the sled when it is on the ground. Additionally, the slide assembly helps prevent or minimize damage to the ground, including to the surface of a race track, due to sliding or moving the sled across the surface during use. In some exemplary embodiments the rollers may be cylindrical rollers mounted on bushings or axels, in other embodiments, they may be spherical roller balls. In another example embodiment, the slide assembly 260 may include a plurality of solid or air-filled wheels or casters rotatably mounted to the sled body 110.

In a further example, the slide assembly 260 may include a plurality of slides (not shown). In one example, the slides may be wooden skids, in another example they may be plastic, such as ABS, acetal, delrin, nylon, polyethylene, polytetrafluoroethylene (e.g., Teflon), or PVC, in another example they may be metal or a combination of materials, covered with a friction reducing coating such as polytetrafluoroethylene. Wooden skids may be low cost and easily replaced by an end user, plastic skids may help reduce the coefficient of friction between the sled 100 and the ground or trailer, and metal skids may provide extra durability. In one exemplary embodiment, the slide assembly 260 may be replaceable in the field, allowing an end user to replace the skids as they wear. By utilizing different materials, the weight, durability, and cost of the slide assembly can be adjusted.

In one exemplary embodiment, the slide assembly is recess mounted in the sled body 110 so that only a portion of the slide assembly 260 extends beyond the bottom plane 220 of the sled body 110. In other exemplary embodiments, the slide assembly 260 may be surface mounted on the frame assembly 200 or to the bottom of the deck 230.

Figure 3A:
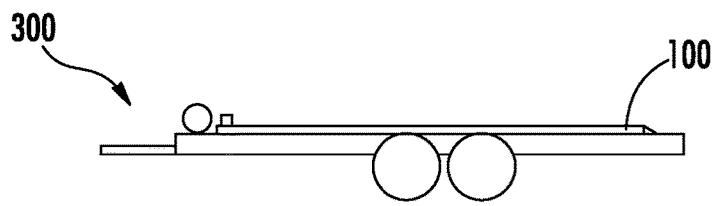
FIGS. 3A-3E are schematic side views of a rapid loading sled in use with a roll-back trailer in accordance with one or more embodiments of the disclosure.
Figure 3B:
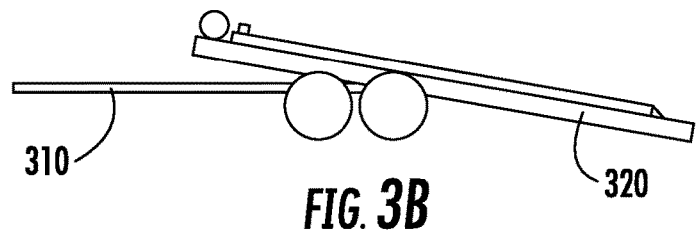
Figure 3C:
Figure 3D:
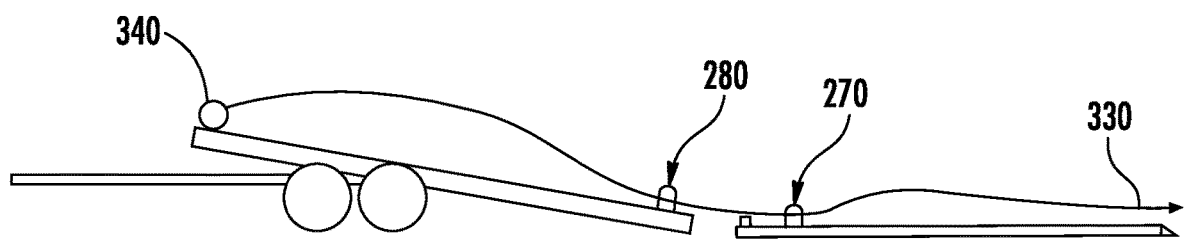

FIGS. 3A-3E are schematic side views of a rapid loading sled in use with a roll-back trailer 300 in accordance with one or more embodiments of the disclosure. In other exemplary embodiments, the rapid loading sled may be adapted for use with fixed or squatting trailers, or used with vehicle-mounted transportation systems such as roll-back trailer beds and haulers (collectively referred to as "trailers"

herein). FIGS. 3A and 3B show the normal operation of the roll-back trailer 300. FIG. 3A shows the side view of a roll-back trailer 300 in the loaded or transport position with the sled 100 resting on the trailer, FIG. 3B shows the roll-back trailer 300 with the axel 310 pulled forward and the trailer bed 320 tilted until the rear end rests on the ground. FIG. 3C shows the side view of the roll-back trailer 300 as the sled 100 is deployed by pulling the roll-back trailer 300 forward, lowering the sled 100 onto the ground. FIG. 3D shows the sled 100 fully deployed and resting on the ground. With the sled 100 deployed, the angle of approach is nominal, with the only obstacle for the car is the vertical distance between the ground and the top of the deck 230. As shown in FIG. 1, the rear 150 of the sled body 110 provides a smooth transition from the ground level to the deck 230. In certain exemplary embodiments, the vertical height from the bottom plane of the frame assembly and the top plane of the deck is less than 6 inches. In some exemplary embodiments, the horizontal length of the transition is less than 6 inches.

As shown in FIG. 3D, in one exemplary use of the sled, once the sled 100 is fully deployed and in position, the retractable cable 330 from a winch 340 mounted on the trailer 320 or truck bed is fed through the winch cable guide assembly 270 and connected to the wheeled vehicle 350. In some exemplary embodiments, the retractable cable 330, is also fed through b-rings 280 or other guides already present on the trailer 320 or truck bed. The winch may then be used to pull the vehicle onto the sled 100. In some embodiments, the winch used for pulling the vehicle onto the sled 100 may be fixed to the sled 100 itself. Power for the sled-mounted winch may come from a standard 5- or 7-prong pigtail that connects to the trailer for power, or, in other embodiments, the power may come from one or more batteries mounted to the sled itself.

Figure 3E:
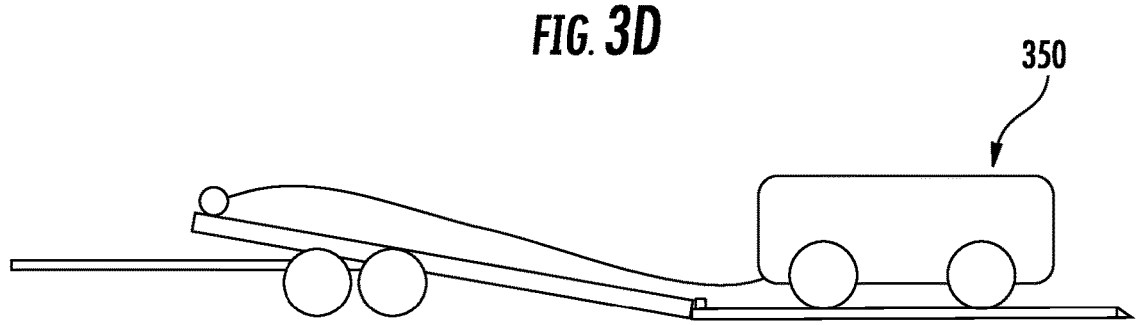

In certain exemplary embodiments, a bulkhead 410 may protrude upward, above the height of the top surface of the deck 230, and be configured to engage the rear edge of the trailer 300 and limit the motion of the sled 100 relative to the trailer 300 during loading. In some embodiments, as shown in FIG. 2, more than one bulkhead 410 element may exist. The bulkhead 410 may be located along or adjacent to the front 140 of the sled 100 and between the two sides 120 and 130 of the sled 100. Some configurations may utilize a bulkhead 410 that runs along a portion or all of the length of the end of the front end of the sled (as shown in FIG. 6, and described more fully below). In certain circumstances, especially in cases with disabled vehicles that must be dragged as opposed to rolled, as the car is pulled onto the sled 100, the sled 100 may also be pulled back towards the trailer 300. As shown in FIG. 3E, once the bulkhead 410 comes in contact with the trailer 300, the sled 100 will stop sliding and the car will be pulled onto the sled 100. In another exemplary embodiment, the sled body 110 may include a traction assembly (not shown) that in one example embodiment, includes a plurality of protrusions mounted to the underside of the sled body 110, extending downward and configured to engage the ground and resist motion of the sled 100 along the ground. In another example, the plurality of protrusions may be selectively retractable so that they can be easily removed once the wheeled vehicle is loaded on the sled 100.

In an alternative embodiment, the sled 100 may be deployed by first attaching the sled to the disabled vehicle. After attachment, the trailer may be pulled forward, causing the sled to be pulled off the trailer due to its anchoring to the disabled vehicle. Once the sled 100 is positioned on the ground, the sled 100 may be disconnected from the disabled vehicle and the vehicle and sled may be loaded as described above.

In some exemplary embodiments, the sled body 110 may also include tie downs or other attachment elements to secure the vehicle to the sled 100 once it is loaded. The tie downs may be mounted on the deck 230, or alongside rails 240. The tie downs may be specific hardware like D-rings, or may be holes, or slots in the deck. In some example embodiments, the car may be secured to the edge of the deck.

Once secured, the winch 340 is activated to pull the sled 100 and the wheeled vehicle 350 back on the trailer 300. In certain embodiments, the bulkheads 410 may be removable to allow the sled 100 to more easily slide back up on the trailer 300. In other exemplary embodiments, a transition or slope 420 may be included at the front 140 of the sled body 110. In yet another exemplary embodiment, additional skids may be included at the front of the sled body 110 for the same purpose.

Figure 4:
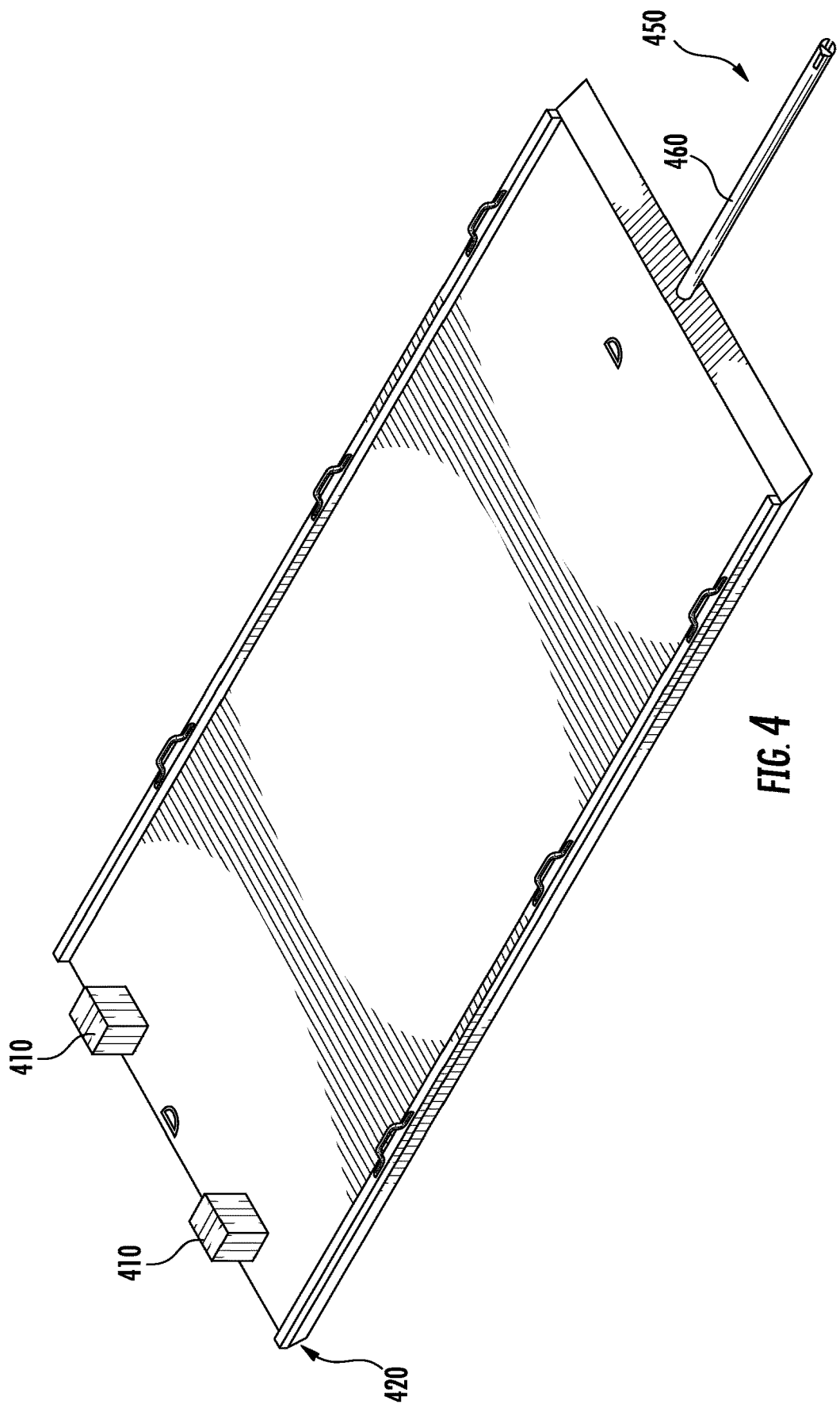
FIG. 4 is a perspective view of a rapid loading sled in accordance with one or more embodiments of the disclosure.

As shown in FIG. 4, one exemplary embodiment of the sled may also include a movable reversing system 450. The reversing system may be mounted to the sled body 110, and selectively extendable between a storage position and a use position. When in the storage position, the reversing system is contained within the sled body, and when extended in the use position, the retractable cable 330 of a winch 340 to apply force in a direction other than the retraction direction of the winch 330. In one example embodiment, the reversing system 450 is configured to allow the winch to pull the wheeled vehicle from the front 140 of the sled body 110 toward and off the rear 150 of the sled body 110 for unloading. In one example embodiment, the reversing system 450 includes an arm 460 that is extendable from the sled body. In some embodiments, the arm 460 may be a telescoping arm made from tubes or square stock, in other embodiments, it may be a single shaft or tube. At the distal end 470 of the arm 460 a pulley may be mounted, through which the retractable cable 330 can be routed. In another exemplary embodiment, the distal end 470 of the arm 460 may include a captured roller around which the retractable cable can be routed. The arm may be extendable in different increments, in some embodiments up to 15 feet.

Figure 5A:
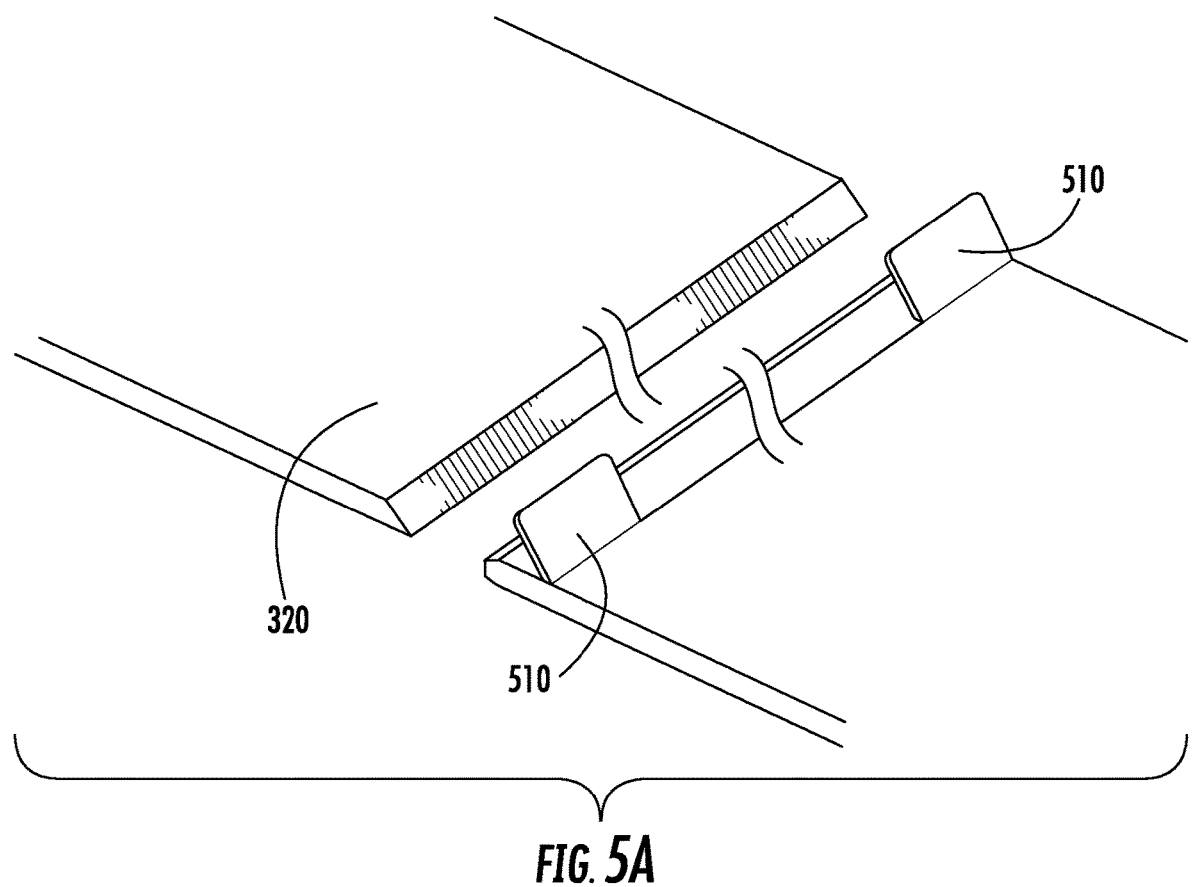
FIG. 5A is a perspective detail view and FIG. 5B is an elevation detail view of a rapid loading sled in accordance with one or more embodiments of the disclosure.
Figure 5B:
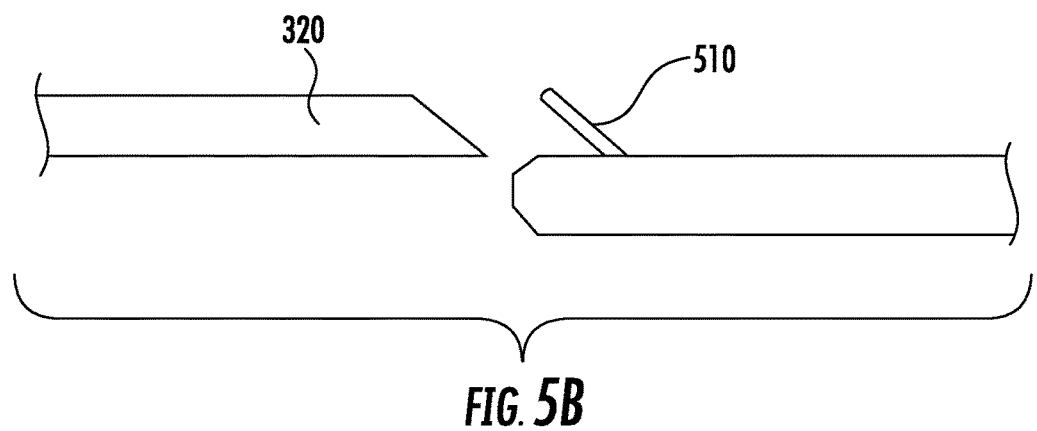

As shown in FIGS. 5A and 5B, in some embodiments, the bulkhead 410 may be adapted to mate with the geometry of the trailer bed 320, as opposed to just abutting the trailer bed 320. In one example embodiment, an angular protrusion 510 may extend upward from the sled body 110, creating a notch or wedge for receiving the trailer bed 320, in order to maintain the positioning of the sled 100 with respect to the trailer bed 320 during loading. In other exemplary embodiments, the bulkhead 410 may be notched, or provide other means of selectively fixing the position of the two components such as a removable pin, a latch, or a clip.

FIGS. 6 and 7 illustrate another exemplary embodiment of the sled 600 in accordance with one or more elements of the present disclosure. As with previous examples, the sled includes a low-profile sled body 610 with two sides 620 and 630, a front 640, a rear 650, a top plane 660, and a bottom plane 670, as well as a frame 680. The frame 680 may include a plurality of longitudinal 682 and lateral 684 braces below the top plane 660 of the sled body 610, to support the deck 690, and to provide rigidity and structural integrity to the sled 600.

The sled 600, may also include a slide assembly. In certain embodiments, the slide assembly may include a first plurality of wheels 700 rotatably mounted toward the front end of the body 610. As shown in FIG. 6, two wheels 700 may be mounted to opposing corners at the front 640 end of the sled 600. These wheels 700 may be sized to create downward slope (from the front to the rear) of the sled 600 when placed on flat ground. In some examples, the wheels may be include pneumatic tires 710 mounted on solid hubs 720, although another other freely rotating solid or composite wheel and tire may be utilized. In other embodiments, the sled may also include a rear slide assembly 730. The rear slide assembly 730 may include a second plurality of wheels 740 rotatably mounted to towards the rear of the sled 600. The second plurality of wheels 740 may be lower profile than the first plurality of wheels 700 to maintain the downward slope of the sled 600 described above. In some embodiments, the second plurality of wheels 740 are solid, however they may also be low profile composite wheels, or in some embodiments, the rear slide assembly 730 may include fixed slides or skids made from ABS, acetal, delrin, nylon, polyethylene, polytetrafluoroethylene (e.g., Teflon), PVC, wood, or metal, as described above.

As shown in FIG. 6, some embodiments may also include an additional rear ramp 750. The ramp 750 may be used to further reduce the transition between the ground and the top plane 660 of the sled body 610 where the vehicle to be transported rests. In some embodiments the rear ramp 750 is removable, and may be manually placed once the sled 600 is deployed. In other embodiments, the ramp 750 is permanently attached to the rear end 650 of the body 610. In some instances the ramp 750 is fixed, while in others it is pivotally mounted to the body 610. Depending on the location of the car to be transported, the ramp 750 may be flipped up (similar to a truck lift gate) or rotated fully until the ramp 750 rests on the top plane 660 of the body 610. The sled 600 may also include a bulkhead 410 that runs along the length of the front end of the body 610. In some embodiments, the sled 600 may also include one or more front bumpers (not shown) that may extend along the front end of the sled 600 to partially or completely cover the first plurality of wheels 700 and provide protection for the wheels 720 to prevent damage during loading and unloading of the sled 600.

In some embodiments, the sled 600 may also include a winch 760. The winch 760 may be mounted directly to the body 610, or otherwise carried on the sled 600. Including a winch on the sled directly (as opposed to relying solely on a winch on a wheeled vehicle carrying apparatus) increases flexibility in use configurations and can reduce the number of guide elements required on the sled itself. The winch 760 may include its own power supply, for example, by one or more batteries carried on the sled, or it may connect to the transport vehicle for power through a conventional 5- or 7-prong pigtail. The deck 690 may also include holes 770 that may be configured as drains, to selectively drain fluids from the sled 600, or may also be adapted to use as tie down points for securement of a vehicle, or attachment of additional items such as tire chocks, d-rings, or other accessories.

Although certain embodiments of the disclosure are described herein and shown in the accompanying drawings, one of ordinary skill in the art will recognize that numerous modifications and alternative embodiments are within the scope of the disclosure. Moreover, although certain embodiments of the disclosure are described herein with respect to specific dunnage configurations, it will be appreciated that numerous other dunnage configurations are within the scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements, or functional capabilities. Thus, such conditional language generally is not intended to imply that certain features, elements, or functional capabilities are in any way required for all embodiments.

I claim:

1. A sled for rapidly loading and transporting a wheeled vehicle on a wheeled vehicle-carrying apparatus, the sled comprising:
   a low-profile sled body, the sled body being generally rectangular and having outermost two sides, a front, a rear, a top plane and a bottom plane, the sled body comprising:
      a frame assembly comprising a top plane and a bottom plane, and
      a deck supported above the frame assembly and comprising a top plane and a bottom plane; and
   a slide assembly, the slide assembly mounted to the sled body,
   wherein the top plane of the deck defines a flat wheel contact surface,
   wherein the flat wheel contact surface of the top plane of the deck extends from a first side of the two sides of the sled body to a second side of the two sides of the sled body,
   wherein the frame assembly and the deck are configured to provide a gradual transition between the ground and the deck at the rear of the sled body,
   wherein the gradual transition comprises a sloping surface angled downward from the top plane of the deck when the deck is parallel to the ground,
   wherein the slide assembly is between the slope and the front of the sled body,
   wherein the sled body is shaped and sized to movably slide onto the wheeled vehicle-carrying apparatus, and
   wherein the sloping surface is immovably fixed to the deck and extends continuously from the top plane of the deck.

2. The sled according to claim 1, wherein the slide assembly comprises a first plurality of wheels, the first plurality of wheels being rotatably mounted toward the front end of the body.

3. The sled according to claim 2, wherein the sled further comprises a rear slide assembly, the rear slide assembly comprising a second plurality of wheels, the second plurality of wheels being rotatably mounted toward the rear end of the body.

4. The sled according to claim 1, wherein the sled further comprises a winch assembly configured to selectively pull a wheeled vehicle on to, or off of, the sled.

5. The sled according to claim 1, wherein the front of the sled is shaped and configured to slide onto a wheeled vehicle-carrying apparatus when pulled towards the wheeled vehicle-carrying apparatus.

6. The sled according to claim 1, wherein the sled further comprises at least one bulkhead, the bulkhead protruding above the height of the top surface of the deck and being configured to engage a rear edge of the wheeled vehicle-carrying apparatus and limit motion of the sled relative to the wheeled vehicle-carrying apparatus.

7. The sled according to claim 1, wherein the sled further comprises a series of guides, configured to receive and control the movement of a retractable cable of a winch.

8. The sled according to claim 5, wherein the sled further comprises a series of guides and the guides are D-rings, rotatably mounted to the top surface of the deck.

9. The sled according to claim 1, wherein the sled further comprises a movable reversing system mounted to the sled body and selectively extendable between a storage position and a use position wherein the reversing system, when positioned in the use position, allows the retractable cable of a winch to apply force in a direction other than the retraction direction of the winch.

10. The sled according to claim 1, wherein the sled further comprises a movable reversing system is configured to allow a winch to pull the wheeled vehicle from the front of the sled body toward and off the rear of the sled body.

11. The sled according to claim 1, wherein the wheeled vehicle-carrying apparatus is a trailer.

12. The sled according to claim 1, wherein the wheeled vehicle-carrying apparatus is a vehicle mounted transportation system.

13. A system for rapidly loading and transporting a wheeled vehicle on a wheeled vehicle-carrying apparatus, the system comprising:
the wheeled vehicle-carrying apparatus; and
a sled, the sled comprising:
a low-profile sled body, the sled body being generally rectangular and having two sides, a front, a rear, a top plane and a bottom plane, the sled body comprising:
a frame assembly comprising a top plane and a bottom plane, and
a deck supported above the frame assembly and comprising a top plane and a bottom plane, and
a slide assembly, the slide assembly mounted to the sled body; and
a winch comprising a retractable cable,
wherein the top plane of the deck defines a flat wheel contact surface,
wherein the flat wheel contact surface of the top plane of the deck extends from a first side of the two sides of the sled body to a second side of the two sides of the sled body,
wherein the frame assembly and the deck are configured to provide a smooth transition from the ground in contact with the bottom plane of the sled body to the deck at the rear of the sled body,
wherein the smooth transition comprises a sloping surface angled downward from the top plane of the deck when the deck is parallel to the ground,
wherein the slide assembly is between the slope and the front of the sled body,
wherein the sled body is shaped and sized to movably slide onto the wheeled vehicle-carrying apparatus, and
wherein the sloping surface is immovably fixed to the deck and extends continuously from the top plane of the deck.

14. The system according to claim 13, wherein the sled further comprises a movable reversing system mounted to the sled body and selectively extendable between a storage position and a use position wherein the reversing system, when positioned in the use position, allows a retractable cable of a winch to apply force in a direction other than the retraction direction of the winch.

15. The system according to claim 14, wherein the reversing system is configured to allow the winch to pull a wheeled vehicle from the front of the sled body toward and off the rear of the sled body.

16. A method of rapidly loading a wheeled vehicle on a wheeled vehicle-carrying apparatus, the method comprising the steps of:
providing a winch, fixedly mounted on a wheeled vehicle-carrying apparatus and having a retractable cable assembly, and a sled apparatus comprising the sled of claim 1 removably mounted on the wheeled vehicle-carrying apparatus;
positioning the wheeled vehicle-carrying apparatus in front of the wheeled vehicle;
deploying the sled apparatus on the ground between the wheeled vehicle-carrying apparatus and the wheeled vehicle;
engaging the retractable cable with the sled apparatus and the wheeled vehicle;
partially retracting the retractable cable using the winch, drawing the wheeled vehicle onto the sled apparatus;
securing the wheeled vehicle to the sled apparatus;
retracting the retractable cable using the winch, drawing the sled apparatus and secured wheeled vehicle onto the trailer; and
securing the sled apparatus on the trailer.

17. The method of claim 16, further comprising routing the retractable cable through a series of guides.

18. The method of claim 16, further comprising providing a winch cable reversing system.

19. The method of claim 18, further comprising the steps of:
unwinding the retractable cable manually;
engaging the retractable cable with the winch cable reversing system; and
retracting the retractable cable using the winch, drawing the sled apparatus and secured wheeled vehicle off the rear of the trailer.

20. The method of claim 19 further comprising the steps of:
unsecuring the wheeled vehicle from the sled apparatus; and
rolling the wheeled vehicle off the sled apparatus manually.

21. The sled according to claim 1, wherein the top plane of the deck has a width that is substantially equivalent to a width of the sled body and a length that is substantially equivalent to a length of the sled body.

22. The sled according to claim 1, wherein the gradual transition between the ground and the deck at the rear of the sled body is defined by a horizontal transition length of less than 6 inches and a vertical transition height of less than 6 inches from the bottom plane of the frame assembly and the top plane of the deck.

23. The sled according to claim 13, wherein the top plane of the deck has a width that is substantially equivalent to a width of the sled body and a length that is substantially equivalent to a length of the sled body.

24. The sled according to claim 13, wherein the smooth transition between the ground and the deck at the rear of the sled body is defined by a horizontal transition length of less than 6 inches and a vertical transition height of less than 6 inches from the bottom plane of the frame assembly and the top plane of the deck.

* * * * *